J. A. TILLERY & S. A. EWALT.
Improvement in Soldering-Tools.
No. 127,120.                    Patented May 21, 1872.
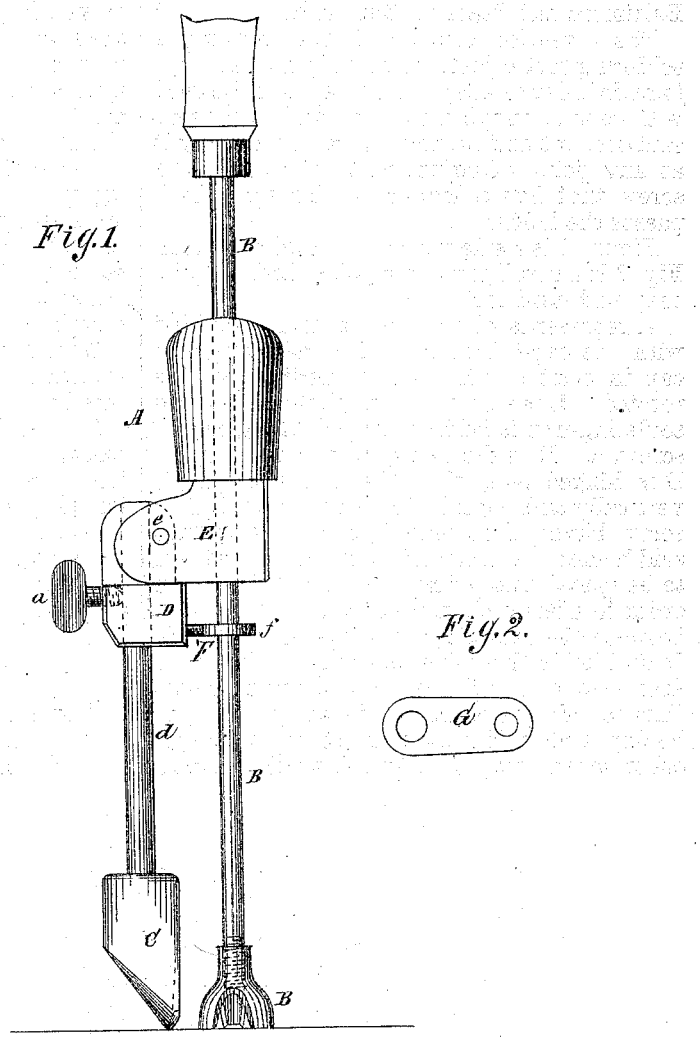

UNITED STATES PATENT OFFICE.

JOHN A. TILLERY AND SAMUEL A. EWALT, OF BALTIMORE, MARYLAND.

IMPROVEMENT IN SOLDERING-TOOLS.

Specification forming part of Letters Patent No. 127,120, dated May 21, 1872.

Specification describing an Improved Tool, invented by JOHN A. TILLERY and SAMUEL A. EWALT, of Baltimore, in the county of Baltimore and State of Maryland.

The invention consists, first, in making a soldering-tool adjustable radially from a hinge-joint, in order to adapt the same tool to be used with caps of varying size; second, in moving said tool out and in, at the same time fixing it at any point of adjustment by means of a screw that has a loop-head through which passes the holder.

Figure 1 is a side view of the soldering-tool. Fig. 2 is a detail view of a yoke which may be used with said tool.

A represents our soldering-tool, provided with the cap-holder B, which maintains the cap in position while the soldering-iron C is rotated. D is a stock, in which the shank $d$ of soldering-iron is held at any point by a clamp-screw, $d$. E is the body, in which the stock D is hinged at $e$, while the holder B passes vertically and loosely therethrough. F is a screw, having loop-head $f$, which connects the said holder B and stock D, while it allows them to be spaced at any desired distance apart. In order to effect a change in the radial distance between the centering holder B and the stock D that holds the soldering-iron, the holder is first removed and the screw F moved in or out. This is our preferable mode of spacing the holder and soldering-iron stock, although other means may be adopted which are perhaps equivalent. For instance, we may use a series of the yokes G, represented in Fig. 2, substituting a larger or smaller one, according as we wish to increase or lessen the distance of the iron from the holder. Again, a set-screw may be applied through the stock E, and against the tool-holder at any point of adjustment.

The advantages of this tool consist, first, in the arc-shape by which we can see at a glance any point which has been left unsoldered or imperfectly soldered, and which defect can be remedied at once without removing the tool; second, in the option that it allows us of using either wire solder or the cheaper drop solder, thereby saving one half the expense.

Having thus described our invention, what we claim as new, and desire to secure by Letters Patent, is—

1. A soldering-tool, provided with a hinged stock, D, to admit of its radial adjustment from the cap-holder B, substantially as and for the purpose described.

2. The hinged stock D of a soldering-iron combined with the screw F, having a loop, $f$, through which passes the centering holder B, as and for the purpose described.

JOHN A. TILLERY.
SAML. A. EWALT.

Witnesses to both signatures:
SOLON C. KEMON,
THOS. D. D. OURAND.